E. LUDESCHER.
ELECTRIC LANTERN.
APPLICATION FILED MAR. 22, 1916.
1,198,734.
Patented Sept. 19, 1916.
2 SHEETS—SHEET 2.
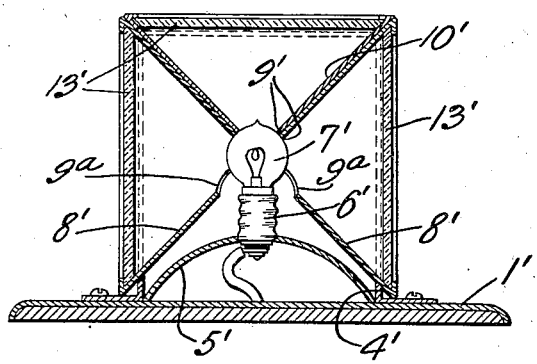
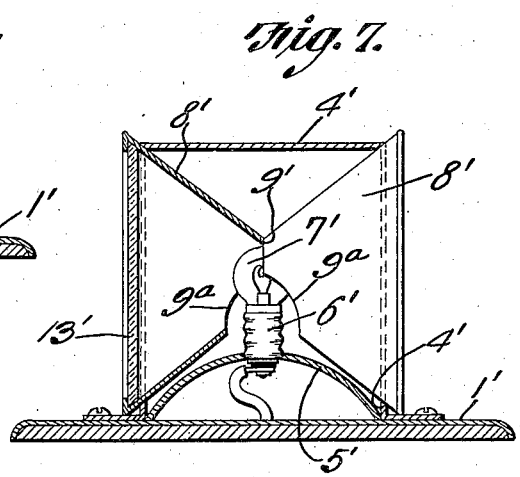
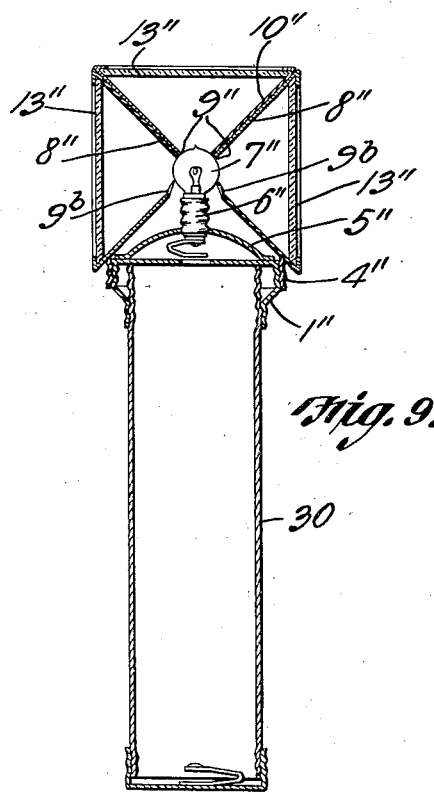
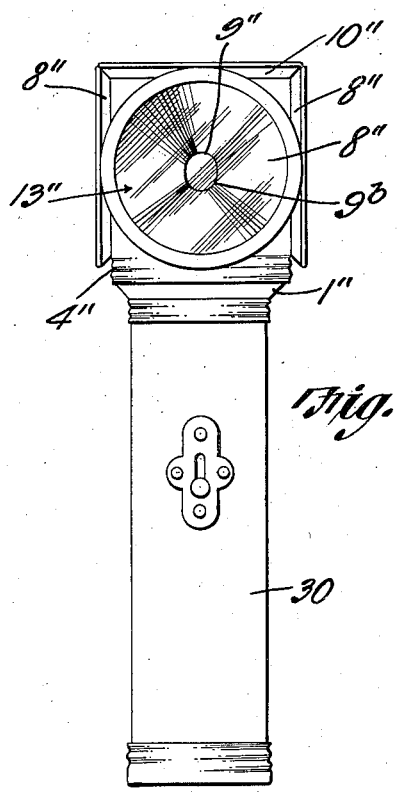
Witnesses
E. Ludescher Inventor
by C. A. Snow & Co.
Attorneys

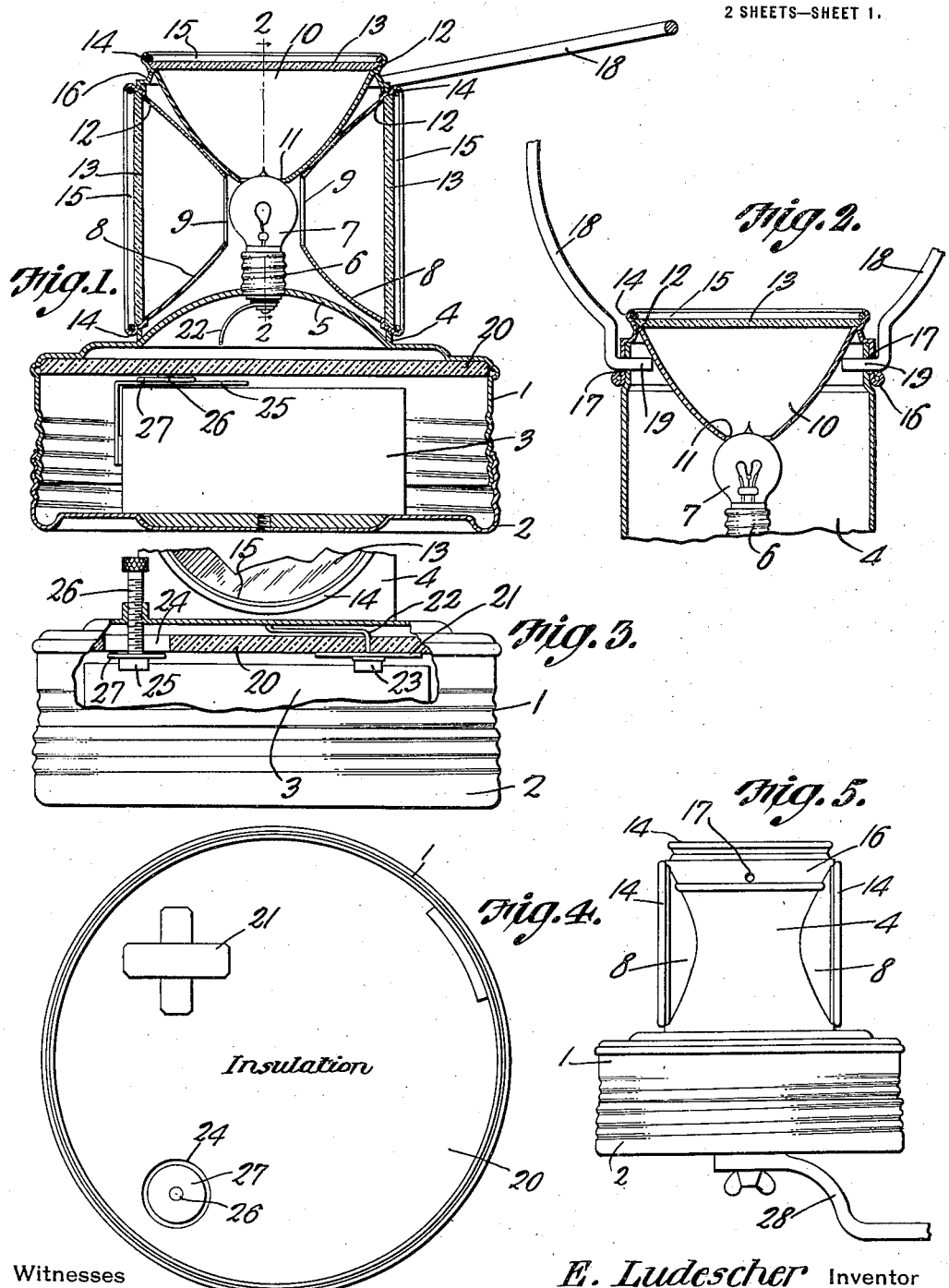

UNITED STATES PATENT OFFICE.

ENGELBERT LUDESCHER, OF CHICAGO, ILLINOIS.

ELECTRIC LANTERN.

1,198,734.  Specification of Letters Patent.  Patented Sept. 19, 1916.

Application filed March 22, 1916. Serial No. 85,966.

*To all whom it may concern:*

Be it known that I, ENGELBERT LUDESCHER, a citizen of the United States, residing at Chicago, in the county of Cook and State of Illinois, have invented a new and useful Electric Lantern, of which the following is a specification.

The present invention appertains to lanterns, and aims to provide a novel and improved electric lantern having a plurality of reflectors, whereby the light is directed in various directions, the lantern being useful upon carriages, automobiles and other vehicles, and being useful for household and other purposes.

The invention embodies a novel assemblage of the component elements, to enhance the utility and efficiency of the lantern.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a vertical median section of the lantern, portions being shown in elevation. Fig. 2 is a vertical section taken on the line 2—2 of Fig. 1 with the bail or handle in upright position. Fig. 3 is a fragmental side elevation of the lantern, portions being broken away and shown in section to illustrate the means for closing the electrical circuit. Fig. 4 is a bottom view of the lantern with the cap of the battery casing and battery removed. Fig. 5 is a view illustrating the lantern supported by a bracket, as when used upon a carriage, motorcycle, automobile or other vehicle. Fig. 6 is a sectional view of a modification. Fig. 7 is a sectional view of another modification, portions being shown in elevation. Fig. 8 is an elevation of the improvements as used in a portable flash light. Fig. 9 is a longitudinal section of the flash light shown in Fig. 8.

The lantern embodies a circular sheet metal battery casing 1 upon which is threaded a sheet metal cap 2 to conceal and hold the battery 3 within the casing. Secured to that side of the casing 1 opposite the cap 2 is a cylindrical lamp casing 4 of smaller diameter than and concentric with the casing 1, that side of the casing 1 to which the casing 4 is attached, by means of solder or otherwise, being provided with a bulged or convexed portion 5 projecting within the casing 4 and having secured thereto an electric lamp socket 6 centrally of said casing 4. An electric lamp or bulb 7 is threaded into the socket 6.

The lamp casing 4 is provided with a plurality of reflectors which are of the dished or parabolic type. To this end, a pair of diametrically opposite reflectors 8 are secured within suitable openings provided in opposite sides of the casing 4 and project within said casing, the inner smaller ends of said reflectors 8 having openings 9 immediately adjacent the bulb of the lamp 7. The casing 4 is provided with an upper reflector 10 resembling the reflectors 8, and provided at its smaller lower end which projects within the casing 4 adjacent the inner ends of the reflectors 8, with an opening or aperture 11 receiving a portion of the bulb of the lamp 7. The reflectors 8 and 10 are provided adjacent their rims with shoulders 12 against which are seated glass or other transparent disks or panes 13, and next outside the disks 13, the rims of the reflectors are provided with inner annular grooves 14 in which spring rings 15 are seated to hold the disks 13 in place. The disks 13 may be clear, or one or more of them can be colored, as circumstances may dictate, and according to the use of the lantern.

The upper reflector 10 which depends within the casing 4 is secured in the upper opening of a cap or ring 16 fitted upon the upper end of the casing 4 and closing the same in connection with the reflector 10. The apron or rim of the cap 16 is cut away to accommodate the reflectors 8, and the rim of the cap 16 and upper end portion of the casing 4 are provided with diametrically opposite registering apertures 17 for the reception of the inturned terminals 19 of a wire bail or handle 18, said terminals 19 springing through the apertures 17 under the tension of the bail 18. Said bail provides convenient means for carrying the lantern, and also serves to hold the cap 16 in place. When the bail is detached, by separating its terminals 19, the cap 16 can also be removed, for removing and replacing the lamp 7.

Fitted within the casing 1 is a circular partition or disk 20 of insulating material and seating against that side of the casing 1 having the convexed portion 5, and said partition 20 carries a contact 21 connected by conductor 22 with the central or insulated terminal of the socket 6 and lamp 7, while the outer terminal of the lamp 7 is grounded to the casing 1 with which the socket 6 is in electrical or metallic engagement. The contact 21 is at that side of the partition 20 facing the battery 3, said battery being inclosed in an insulating jacket as usual, and having one of its spring terminals 23 bearing against the contact 21 to electrically connect the respective terminal of the lamp with one pole of the battery. The partition 20 is provided with an opening or aperture 24 adjacent the other spring terminal 25 of the battery 3, and a thumb screw 26 is threaded through the casing 1, at that side of the casing having the convexed portion 5, and a contact disk 27 is secured to the inner end of the screw 26 to move through the opening 24 into and out of engagement with the terminal 25, to thereby act as a switch for making and breaking the circuit including the battery 3, terminal 25, disk 27, screw 26, casing 1, socket 6, lamp 7, wire or conductor 22, contact 21, and terminal 23. Thus, by rotating the screw 26, the circuit can be closed and opened at will for extinguishing and lighting the lamp, respectively.

Fig. 5 illustrates the bail 18 detached, and also illustrates a bracket 28 attached to the cap 2 of the casing 1 to support the lantern upon a vehicle. The light emitted from the lamp passes into the reflectors and is thereby directed in various directions, according to the number and arrangement of the reflectors.

The modification illustrated in Fig. 6, comprises a suitable base 1' having secured thereon a casing 4'. The base 1' carries a convexed portion 5' within the lower portion of the casing 4', and a lamp socket 6' is carried by the portion 5' and receives an incandescent electric lamp 7'. Opposite conical reflectors 8' are secured within opposite sides of the casing 4', and an upper conical reflector 10' is secured within the upper end of the casing, and the reflectors are soldered or otherwise secured together, the sides thereof being straight for this purpose. The adjacent ends or apices of the reflectors have openings 9' partially receiving the bulb or lamp 7', and the openings or apertures 9' of the reflectors 8' are enlarged, as at 9$^a$, whereby the casing 4' and its reflectors can be readily applied to and removed from the base 1', the lamp 7' moving through the enlargements 9$^a$ of the respective apertures 9'. Glass disks or panels 13' are preferably secured within the mouths of the reflectors.

As illustrated in Fig. 7, two opposite reflectors 8' are employed exclusive of any others, whereby the light is directed in opposite directions.

In Figs. 8 and 9, the invention is embodied in a portable flash light, so that the same has five deflectors instead of one, whereby the light is directed in various directions. Thus, a cap 1'' is attached to one end of the casing or barrel 30 of the flash light, which is used as a handle, and the light casing 4'' is detachably connected with the cap 1'', said cap 1'' having a convexed portion 5'' within the casing 4''. The portion 5'' carries a lamp socket 6'' receiving the lamp 7'', and the casing 4'' has four conical reflectors 8'', and an upper conical reflector 10'', which reflectors are soldered or otherwise secured together at their meeting sides. Glass disks or panels 13'' are preferably secured within the mouths of the reflectors, and the apices of the reflectors have apertures 9'' receiving the lamp 7'', the apertures 9'' of the reflectors 8'' being enlarged, as at 9$^b$, whereby when the casing 4'' is applied and removed, the lamp 7'' can pass through the enlargements 9$^b$. This enables the reflectors to be removed and applied as a unit, and also enables the casing 4'' to be removed for replacing the lamp when burnt out.

Having thus described the invention, what is claimed as new is:—

1. An electric lantern embodying a lamp casing, an electric lamp therein, a dished reflector carried by one side of the casing and projecting thereinto, and a dished reflector carried by one end of said casing and projecting thereinto said reflectors having their smaller ends open and arranged immediately adjacent said lamp, the last mentioned reflector being detachable from the casing.

2. An electric lantern embodying a lamp casing, an electric lamp therein, a dished reflector carried by one side of the casing and projecting thereinto, a removable cap closing one end of the casing, a dished reflector carried by the cap and projecting into the casing, said reflectors having their smaller ends open and arranged adjacent said lamp.

3. An electric lantern embodying a lamp casing, an electric lamp therein, a dished reflector carried by one side of the casing and projecting thereinto, a removable cap closing one end of the casing, a dished reflector carried by the cap and projecting into the casing, said reflectors having their smaller ends open and arranged adjacent said lamp, and a bail handle having its terminals engageable with said cap and casing to hold the cap in place.

4. An electric lantern embodying a battery casing, a lamp casing attached thereto and projecting therefrom, an inwardly projecting dished reflector carried by the lamp casing and having its inner end open, the battery casing having a convexed portion projecting into the lamp casing, a lamp socket carried by said convexed portion, a lamp carried by said socket and coöperating with the inner open end of said reflector, and means for electrically connecting the lamp with a battery within the battery casing.

5. An electric lantern embodying a casing having a removable cap and an opposite convexed portion, an electric lamp carried by said portion, an insulating partition within the casing adjacent the said portion and having an opening, a battery within the casing having one terminal adjacent the said opening, a contact carried by said partition engaging the other terminal of the battery and connected to one terminal of the lamp, the other terminal of the lamp being grounded to the casing, and a switch member carried by said casing movable through said opening into and out of engagement with the first mentioned terminal of the battery.

In testimony that I claim the foregoing as my own, I have hereto affixed my signature in the presence of two witnesses.

ENGELBERT LUDESCHER.

Witnesses:
JACK RAEDER,
MAX HARTUNG.